J. J. BAVOR.
SPRINKLER.
APPLICATION FILED NOV. 8, 1918.
1,317,540.
Patented Sept. 30, 1919.
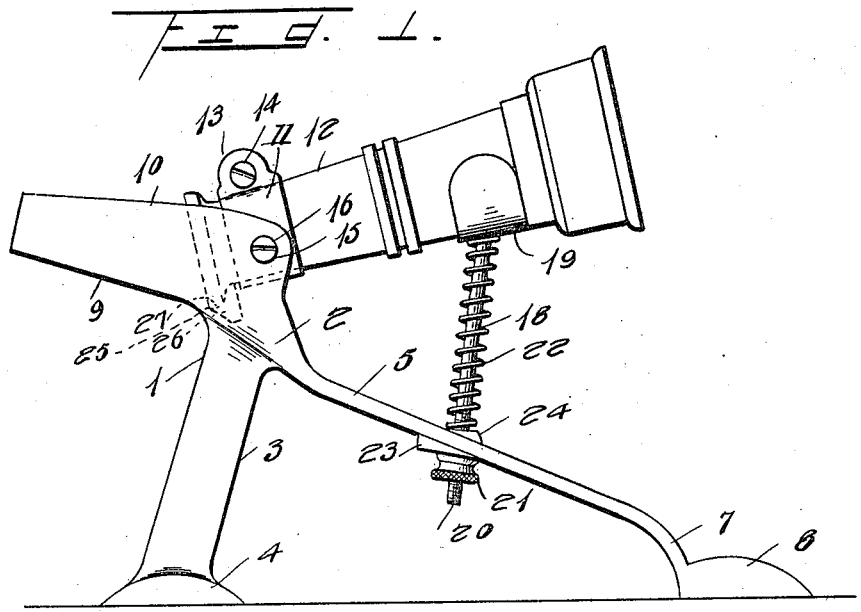
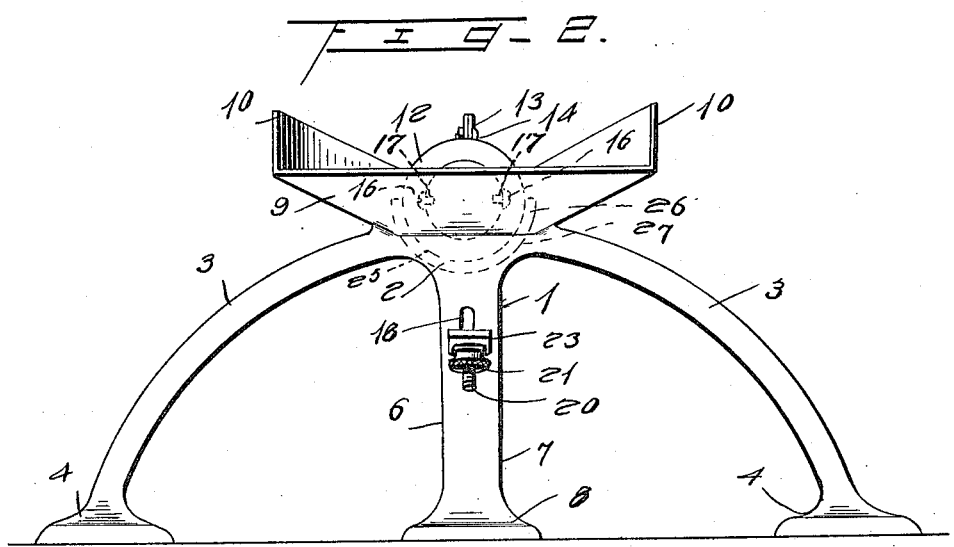
Inventor
J. J. BAVOR
Attorney

UNITED STATES PATENT OFFICE.

JOHN J. BAVOR, OF CLEVELAND, OHIO.

SPRINKLER.

1,317,540. Specification of Letters Patent. Patented Sept. 30, 1919.

Application filed November 8, 1918. Serial No. 261,656.

*To all whom it may concern:*

Be it known that I, JOHN J. BAVOR, a citizen of the United States, residing at Cleveland, in the county of Cuyahoga and State of Ohio, have invented certain new and useful Improvements in Sprinklers; and I do hereby declare the following to be a full, clear, and exact description of the invention, such as will enable others skilled in the art to which it appertains to make and use the same.

This invention relates to lawn sprinklers, and the primary object of the invention is to provide an improved lawn sprinkler, which can be used in connection with the ordinary hose nozzle.

Another object of the invention is to provide a lawn sprinkler having a deflecting plate and means for supporting a hose nozzle at an angle to the plate, so that the water from the nozzle, will be broken into spray.

A further object of the invention is to provide an improved means for attaching the hose nozzle to the sprinkler, so that the nozzle can be adjusted with relation to the deflecting plate, in order to obtain a fine or coarse spray, as may be desired.

A still further object of the invention is to provide an improved lawn sprinkler of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described and claimed, and illustrated in the accompanying drawing, in which—

Figure 1 is a side elevation of the improved lawn sprinkler, and

Fig. 2 is a front elevation of the same.

Referring to the drawings in detail, wherein similar reference characters designate corresponding parts throughout the several views, the numeral 1 generally indicates a sprinkler which includes a body plate 2 having formed integrally therewith and intermediate the ends thereof outwardly and downwardly extending arcuate supporting legs 3 which have their lower terminals bent outwardly to provide feet 4. The side edges of the body plate 2 and legs 3 are provided with upstanding reinforcing flanges 5, which stiffen the plate and legs and prevent distortion thereof. The sprinkler preferably is formed from a single sheet of metal, but it is to be understood that the same can be cast or molded if so desired. The body plate 2 is provided with a downwardly and rearwardly extending inclined extension 6, which forms a supporting leg for the rear of the plate. The extension 6 is bent downwardly as at 7 and is bent outwardly to provide a foot 8. The forward end of the body plate 2 is inclined upwardly and flared outwardly to provide a deflecting plate 9, the side edges of which are bent upwardly to provide guide flanges 10 which confine the water spray onto the plate.

A split sleeve 11 is provided for receiving the forward end of the hose nozzle 12, which may be of any preferred construction. The terminals of the sleeve 11 are provided with ears 13 through which extend adjusting bolts 14 by means of which the sleeve is held in adjusted position on the nozzle. The upper rear ends of the guide flanges 10 are provided with alined apertures 15 which receive screws 16. The inner ends of the screws 16 are rounded to provide pivots or bearings 17 which are fitted in suitable apertures in the sleeve 11. These screws form means whereby the sleeve and nozzle can be swung, so as to adjust the angle of the nozzle with relation to the deflecting plate 9.

The extension 6 is provided with a longitudinally extending slot 17 through which extends a supporting rod 18. A U-shaped yoke 19 is formed on the upper end of the adjusting rod 18 and forms means for engaging and supporting the rear end of the nozzle 12. The lower terminal of the adjusting rod 18 is provided with screw threads 20 on which is turned an adjusting nut 21, by means of which the same is raised and lowered so as to swing the nozzle 12 on the screws 16. An expansion coil spring 22 is coiled around the rod 18 and is confined between the yoke 19 and the extension 6 and normally tends to hold the rear end of the nozzle in raised position. A guide plate 23 is slidably mounted on the rod 18 and is interposed between the adjusting nut 21 and the extension 6 and is provided with an upwardly extending lug 24, which protrudes through the slot 17 and forms means for spacing the adjusting nut from the extension 6 and to facilitate the sliding of the rod through the slot 17 during the adjustment thereof.

The body plate 2 is provided with a transverse recess 25 adjacent to the rear ends of the flanges 10 and in which is fitted a rubber gasket 26, the upper surface of which is provided with a groove 27 to conform to the configuration of the forward end of the nozzle. This gasket 26 forms means for receiving one end of the nozzle and provides a rest for the same and prevents the flow of water down the extension 6.

From the foregoing description it can be seen that an improved lawn sprinkler is provided which can be used in connection with any ordinary type of hose nozzle, so that the water therefrom can be sprayed over the desired place to be watered.

It is also to be understood that the device may be used as a hose support and the hose nozzle 12 can be adjusted, so that the stream of water therefrom will not engage the deflecting plate 9 and thus not be broken into spray.

In practice, I have found that the form of my invention illustrated in the accompanying drawings, and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

1. In a device of the class described, the combination, of a supporting frame including a body plate and downwardly extending supporting feet, an upwardly extending outwardly flared deflecting plate formed on the supporting frame, guide flanges formed on the deflecting plate, a hose nozzle, means for detachably and pivotally connecting the forward end of the hose nozzle to the guide flanges, and adjustable means carried by the body plate for engaging the rear end of the nozzle and swinging the same on the pivot.

2. In a device of the class described, the combination, a frame including a body plate and downwardly extending supporting feet, an upwardly inclined and outwardly flared deflecting plate, upwardly extending guide flanges formed on the side edges of the deflecting plate, of a hose nozzle, a sleeve, means for pivotally securing the sleeve to the guide flanges, means for adjustably holding the sleeve to the forward end of the nozzle, an adjusting rod, a U-shaped yoke formed on the upper end of the rod for engaging the rear end of the nozzle, means for adjustably securing the lower end of the adjusting rod to the body plate, and a spring coiled around the adjusting rod and confined between the U-shaped yoke and the body plate, as and for the purpose specified.

In testimony whereof I affix my signature in presence of two witnesses.

JOHN J. BAVOR.

Witnesses:
CHAS. J. SALZER,
FRED A. RICE.

Copies of this patent may be obtained for five cents each, by addressing the "Commissioner of Patents, Washington, D. C."